(12) United States Patent
Jiang et al.

(10) Patent No.: US 10,565,681 B2
(45) Date of Patent: Feb. 18, 2020

(54) SYSTEM AND METHOD FOR IMAGE DEMOSAICING

(71) Applicant: SZ DJI TECHNOLOGY CO., LTD., Shenzhen (CN)

(72) Inventors: Caigao Jiang, Shenzhen (CN); Zisheng Cao, Shenzhen (CN); Mingyu Wang, Shenzhen (CN)

(73) Assignee: SJ DJI TECHNOLOGY CO., LTD., Shenzhen (CN)

( * ) Notice: Subject to any disclaimer, the term of this patent is extended or adjusted under 35 U.S.C. 154(b) by 29 days.

(21) Appl. No.: 15/446,033

(22) Filed: Mar. 1, 2017

(65) Prior Publication Data

US 2017/0178292 A1    Jun. 22, 2017

Related U.S. Application Data

(63) Continuation of application No. PCT/CN2014/086558, filed on Sep. 15, 2014.

(51) Int. Cl.
*G06T 3/40* (2006.01)
*G06T 5/20* (2006.01)
*H04N 5/232* (2006.01)

(52) U.S. Cl.
CPC .............. *G06T 3/4015* (2013.01); *G06T 5/20* (2013.01); *H04N 5/23293* (2013.01); *G06T 2207/20004* (2013.01); *G06T 2207/20032* (2013.01)

(58) Field of Classification Search
CPC ..................... G06T 3/4015; G06T 5/20; G06T 2207/20004; G06T 2207/20032; H04N 5/23293
See application file for complete search history.

(56) References Cited

U.S. PATENT DOCUMENTS 8,564,680 B1 * 10/2013 Aldrich ................. G06T 3/4015
348/222.1

2002/0167602 A1 * 11/2002 Nguyen ................. G06T 3/4007
348/280

(Continued)

FOREIGN PATENT DOCUMENTS

CN      101185344 A      5/2008
CN      101401442 A      4/2009

(Continued)

OTHER PUBLICATIONS

Dimitry Gorinevsky, "Optimization-based Design and Implementation of Multi-dimensional Zero-phase IIR Filters" IEEE Transactions of Circuits and Systems 1 dated 2005.*
Jeon et al., "Demosaicking of Noisy Bayer-Sampled Color Images With Least-Squares Luma-Chroma Demultiplexing and Noise Level Estimation" http://pgembeddedsystems.com/securelogin/upload/project/IEEE/29/PG2013IP011/06272349.pdf dated Jan. 1, 2013 (Year: 2013).*

(Continued)

*Primary Examiner* — Ming Y Hon
(74) *Attorney, Agent, or Firm* — Anova Law Group, PLLC (57) ABSTRACT

A system for image demosaicing and methods for manufacturing and using same. The image demosaicing system includes a lens, a mosaicing filter, an image sensor array and a processing module. The processing module is configured to perform adaptive demosaicing on a mosaiced image that was generated from sensed light that passed through the lens and mosaicing filter. The method of image demosaicing comprises interpolating values of unknown red, green and blue pixels in a horizontal and vertical direction and adaptively selecting one of the interpolation results for each pixel. The disclosed system and method provide for high quality image processing while operating at various Signal to Noise Ratios (SNRs) and require minimal computational time and overhead.

17 Claims, 6 Drawing Sheets

(56) References Cited

U.S. PATENT DOCUMENTS

| | | | |
|---|---|---|---|
| 2005/0200733 A1* | 9/2005 | Malvar | G06T 3/4015 348/272 |
| 2005/0244052 A1* | 11/2005 | Keshet | G06T 3/4015 382/162 |
| 2008/0240203 A1* | 10/2008 | Baqai | G01V 1/28 375/130 |
| 2009/0096899 A1* | 4/2009 | Quan | G06T 3/4015 348/273 |
| 2010/0104214 A1* | 4/2010 | Tamburrino | H04N 9/045 382/276 |
| 2011/0273593 A1* | 11/2011 | Cohen | H04N 9/045 348/240.2 |
| 2012/0098991 A1 | 4/2012 | Nomura | |
| 2012/0163734 A1 | 6/2012 | Lee | |
| 2014/0253808 A1 | 9/2014 | Tachi | |
| 2015/0042775 A1* | 2/2015 | Zhao | H04N 9/045 348/71 |

FOREIGN PATENT DOCUMENTS

| | | |
|---|---|---|
| CN | 102857692 A | 1/2013 |
| CN | 104038746 A | 9/2014 |
| JP | 2012090146 A | 5/2012 |
| JP | 2013034194 A | 2/2013 |
| JP | 2013066146 A | 4/2013 |
| WO | 2011049781 A1 | 4/2011 |

OTHER PUBLICATIONS

The World Intellectual Property Organization (WIPO) International Search Report and Written Opinion for PCT/CN2014/086558 dated Apr. 29, 2015 10 Pages.

* cited by examiner

LEGEND:

SYSTEM AND METHOD FOR IMAGE DEMOSAICING

CROSS-REFERENCE TO RELATED APPLICATION

This is a continuation application of International Application No. PCT/CN2014/086558, filed on Sep. 15, 2014, the entire contents of which are incorporated herein by reference.

FIELD

The present disclosure relates generally to imaging and image processing and more particularly, but not exclusively, to systems and methods for image demosaicing.

BACKGROUND

Conventional digital cameras acquire images by using light image sensor arrays. However, prior to light entering these sensor arrays, the light first passes through a color filter array (CFA), allowing only one wavelength of the light to enter any given sensor pixel of the sensor array. This results in a mosaic image where each pixel only contains one color—typically only red, green or blue. The process of converting this mosaic image to a full-color image is called "demosaicing."

Various demosaicing methods exist in the art; however, many of these methods result in undesirable effects in the converted image including false color artifacts, such as chromatic aliases, zippering effects (abrupt unnatural changes of intensity over a number of neighboring pixels), purple fringing and loss of image resolution.

Additionally, most conventional demosaicing methods fail to provide adequate image conversion for images that range from high to low noise. Accordingly, such demosaicing methods are not robust enough to be used on a variety of images.

Other conventional demosaicing methods have large computational complexity, which results in undesirably slow image processing speeds and inability for fast processing using hardware and/or software available on a conventional portable camera system.

In view of the foregoing, a need exists for an improved image demosaicing system and method in an effort to overcome the aforementioned obstacles and deficiencies of conventional image demosaicing systems and methods.

SUMMARY

In accordance with the present disclosure, there is provided a method of adaptive demosaicing of a mosaiced image, comprising receiving the mosaiced image having a mosaic pattern with a first, second and third color, and demosaicing the mosaiced image to generate an adaptively demosaiced image. The adaptive demosaicing comprises interpolating values of a portion of unknown pixels of the first color in a horizontal or vertical direction, interpolating values of a portion of unknown pixels of the second color in a horizontal or vertical direction, and interpolating values of a portion of unknown pixels of the third color in a horizontal or vertical direction.

Also in accordance with the present disclosure, there is provided a method of adaptive demosaicing of a mosaiced image, comprising receiving the mosaiced image having a mosaic pattern with a first, second and third color, obtaining a noise level index for the mosaiced image; determining whether the noise level index is greater than a threshold value, if the noise level index is not greater than the threshold value, then performing a bilinear demosaicing on the mosaiced image to generate a bilinearly demosaiced image, and if the noise level index is greater than the threshold value, then performing an adaptive demosaicing on the mosaiced image to generate an adaptively demosaiced image. The adaptive demosaicing comprises interpolating values of a portion of unknown pixels of the first color in a horizontal or vertical direction, interpolating values of a portion of unknown pixels of the second color in a horizontal or vertical direction, and interpolating values of a portion of unknown pixels of the third color in a horizontal or vertical direction.

Also in accordance with the present disclosure, there is provided a camera system, comprising a lens, a mosaicing filter, an image sensor array configured to generate a mosaiced image comprising a mosaic pattern having a first, second and third color and based on sensed light that passes through the lens and the mosaicing filter, and a processing module configured to demosaic the mosaiced image via interpolation of unknown pixels and generate a demosaiced image by interpolating values of a portion of unknown pixels of the first color in a horizontal or vertical direction, interpolating values of a portion of unknown pixels of the second color in a horizontal or vertical direction, and interpolating values of a portion of unknown pixels of the third color in a horizontal or vertical direction.

Also in accordance with the present disclosure, there is provided a camera system comprising a lens, a mosaicing filter, an image sensor array operable to generate a mosaiced image comprising a mosaic pattern having a first, second and third color and based on sensed light that passes through the lens and mosaicing filter, and a processing module configured to demosaic the mosaiced image via interpolation of unknown pixel values and configured to generate a demosaiced image by determining a noise level index for the mosaiced image, determining whether the noise level index is greater than a threshold value, if the noise level index is not greater than the threshold value, then performing a bilinear demosaicing on the mosaiced image to generate a bilinearly demosaiced image, and if the noise level index is greater than the threshold value, then performing an adaptive demosaicing on the mosaiced image to generate an adaptively demosaiced image. The adaptive demosaicing comprises interpolating values of a portion of unknown pixels of the first color in a horizontal or vertical direction, interpolating values of a portion of unknown pixels of the second color in a horizontal or vertical direction, and interpolating values of a portion of unknown pixels of the third color in a horizontal or vertical direction.

BRIEF DESCRIPTION OF THE DRAWINGS

FIG. 3b is a flow chart of a sub-method for obtaining a mosaiced digital image, which is a portion of the method depicted in FIG. 3a.

FIG. 4 is a flow chart of a sub-method for adaptive demosaicing an image, which is a portion of the method depicted in FIG. 3a.

FIG. 6b shows a table of the results depicted in the graph of FIG. 6a.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available demosaicing systems and methods fail to provide for optimal image interpolation and require large software or hardware overhead, improved demosaicing systems and methods that provide for high quality image processing while operating at various Signal to Noise Ratios (SNRs), and requiring minimal computational time and overhead, can prove desirable and provide a basis for a wide range of digital imaging applications, such as digital camera systems, and the like. This result can be achieved, according to one embodiment disclosed herein, by a digital camera system 100 as illustrated in FIG. 1a.

Figures 1A, 1B:
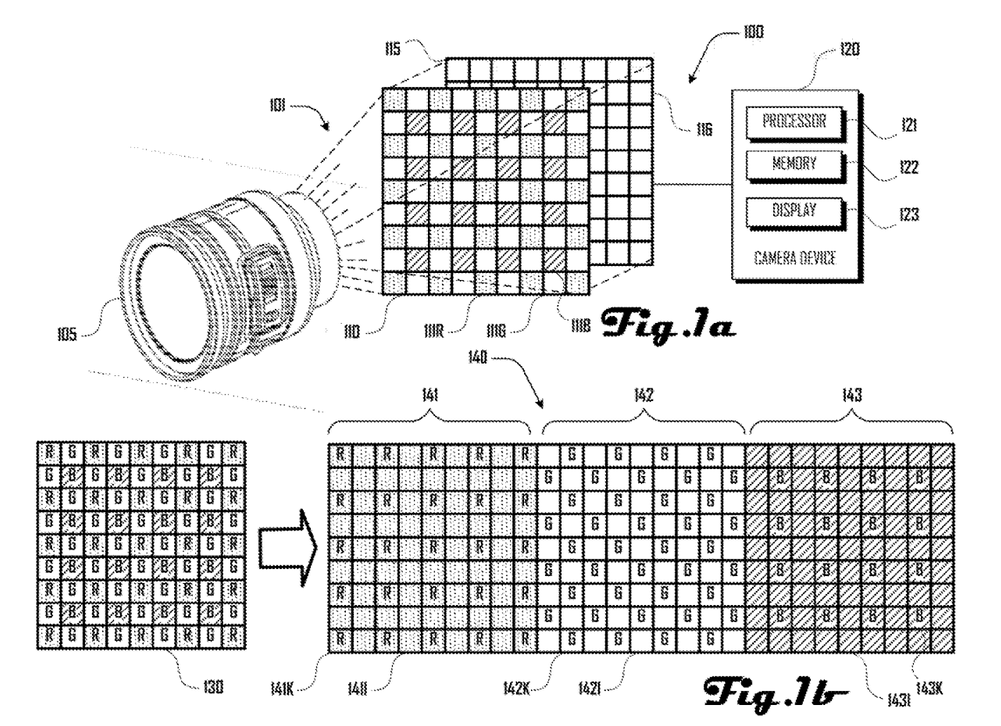
FIG. 1a is an exemplary drawing illustrating an embodiment of a digital camera system for capturing a digital image, wherein the digital camera system includes a lens, a mosaicing filter, a sensor array and a camera device.
FIG. 1b is an exemplary drawing illustrating exemplary mosaiced RGB image data being converted into triplet RGB image data through interpolation demosaicing.

Turning to FIG. 1a, the digital RGB camera system 100 is abstractly shown including a lens 105, a mosaicing filter 110, a sensor array 115 and a camera device 120. The camera device 120 is operably connected to the sensor array 115, and comprises a processor 121 (or processing module), a memory 122 and a display 123. In various embodiments, the RGB camera system 100 can be disposed in a suitable camera housing (not shown).

As illustrated in FIG. 1a, light 101 enters the lens 105, which focuses the light 101 on the mosaicing filter 110. The mosaicing filter 110 can comprise a plurality of translucent red pixels, green pixels and blue pixels 111R, 111G, 111B that are arranged in a matrix. The light 101 passes through the mosaicing filter 110 and onto the sensor array 115 having a plurality of corresponding sensor pixels 116 that convert the received light into a digital signal. The sensor array 115 generates a mosaiced digital image 130 as depicted in FIG. 1b. Staying with FIG. 1a, the mosaicing filter 110 includes a pattern of translucent red pixels, green pixels and blue pixels 111R, 111G, 111B to substantially filter out all other wavelengths of light such that each sensor pixel 116 only records a value for red, blue or green light.

This mosaiced digital image 130 can be converted to a conventional RGB triplet image 140 through interpolation as described herein. For example, each pixel in a conventional RGB image comprises red, green and blue components that are combined to define the color of that pixel from a full spectrum of visible light. Accordingly, a conventional RGB triplet image 140 comprises a red portion 141, a green portion 142, and a blue portion 143, that collectively define a full-color RGB image.

To convert the mosaiced digital image 130 to a RGB triplet image 140, missing information can be added through a process of interpolation. Stated another way, the mosaiced digital image 130 only has one-third of the total information that will be present in the RGB triplet image 140 when formed, and therefore this missing information can added by inferring its value based on the pixels around it. For example, as shown in FIG. 1b, the mosaiced digital image 130 comprises a 9×9 array of pixels where values of each pixel are known for either a red, green or blue value.

When converting to the RGB triplet image 140, however, a 9×9 image for each of the red, green and blue portions 141, 142, 143 can be generated. For example, for the red portion 141, many of the red values for a given pixel location are already known 141K (pixels 141K signified by the 'R' in a given location in the red portion 141) from the value being present in the mosaiced digital image 130. However, the remaining pixel values (pixels 141I signified by the blank pixel in a given location in the red portion 141) can be interpolated so that a full 9×9 array of red values can be present for the red portion 141. Similarly, such interpolation can also occur for the green portion 142 and the blue portion 143. The green portion 142 includes known pixels 142K and includes unknown pixels 142I that can be interpolated. The blue portion 143 includes known pixels 143K and includes unknown pixels 143I that can be interpolated.

Figure 2:
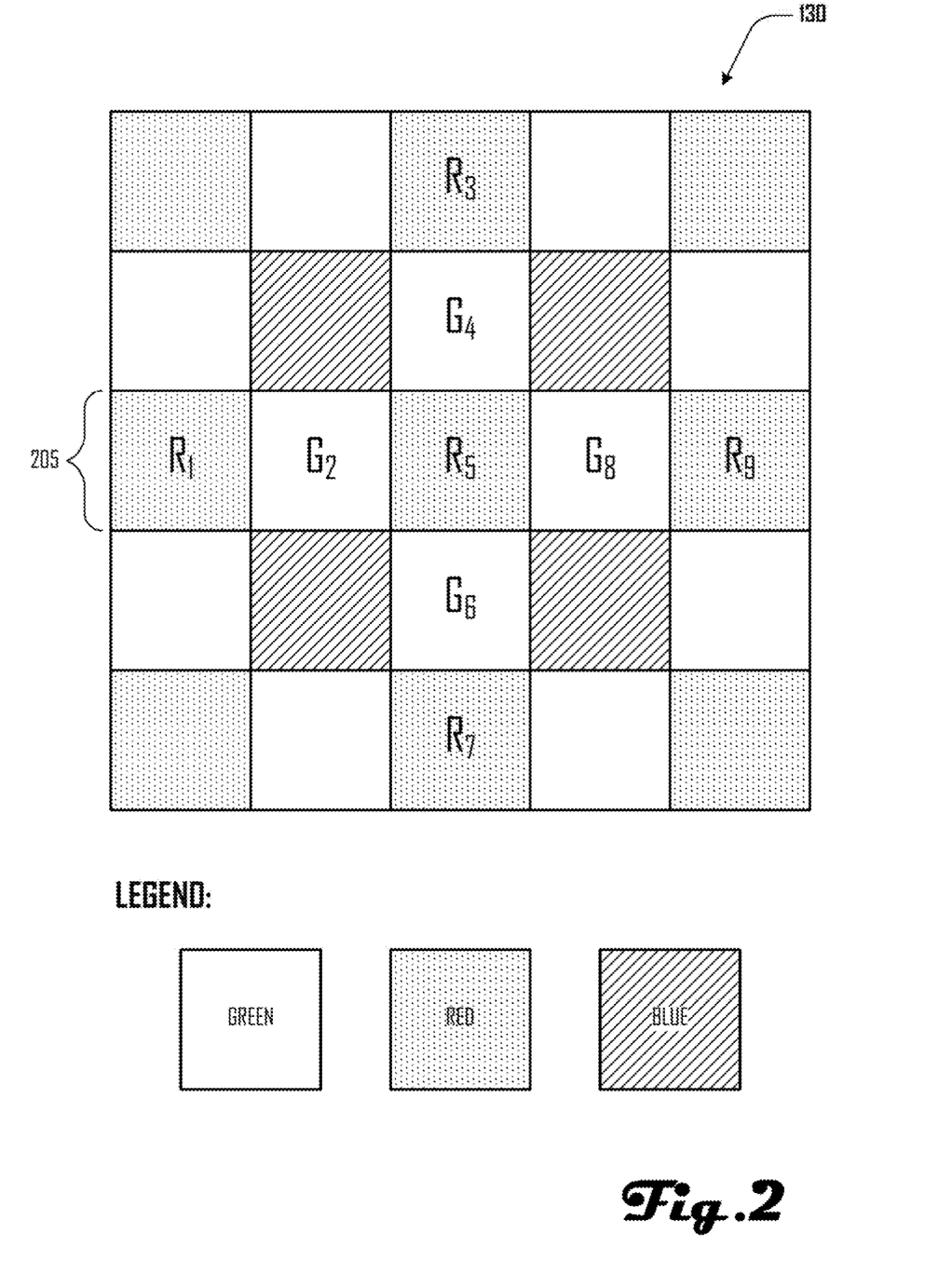
FIG. 2 is an exemplary drawing illustrating an example portion of a mosaiced RGB image.

FIGS. 1a and 1b depict the mosaicing filter 110 and captured mosaiced digital image 130 as being in a Bayer filter pattern, where there are two green pixels 111G for every red or blue pixel 111R, 111B, with offset alternating rows of R-G and B-G alternating pixels. FIG. 2 also depicts a mosaiced digital image having a Bayer filter pattern, and FIG. 2 is referenced in more detail in various examples throughout the following disclosure. Such a Bayer filter pattern is used conventionally in digital imaging; however, in some embodiments, the methods of demosaicing and/or interpolation can be applied to other filter patterns that comprise two or more pixel colors in various suitable pattern arrangements. For example, in some embodiments, it may be desirable to capture images with a filter where there are two red pixels 111R for every green or blue pixel 111G, 111B or where there are four pixel colors (e.g., CMYK). Accordingly, the present disclosure is not limited to only RGB imaging, and can instead be applied to various imaging methods, systems and protocols.

The abstracted digital RGB camera system 100 is depicted including a processor 121, memory 122 and display 123; however, further embodiments can include any suitable set of components and any of the processor 121, memory 122 and/or display 123 can be present in plurality or absent in some embodiments. In one embodiment, the memory 122 can store instructions for performing any of the methods described herein and can store digital images 130, 140 as discussed herein. The display 123 can be configured to display digital images 130, 140, and in various embodiments, and can comprise a Liquid Crystal Display (LCD); Light Emitting Diode (LED) display, Organic Light Emitting Diode (OLED) display, Digital Light Projection (DLP) display, or the like.

The abstracted digital RGB camera system 100 is depicted using a Single-Lens Reflex (SLR) lens; however, in various embodiments, any suitable lens system can be used, including a pin-hole lens, a biological lens, a simple convex glass lens, or the like. Additionally, lenses in accordance with various embodiments can be configured with certain imaging properties including a macro lens, zoom lens, telephoto lens, fisheye lens, wide-angle lens, or the like.

Additionally, while the digital RGB camera system 100 can be used to detect light in the visible spectrum and generate images therefrom, in some embodiments, the digital RGB camera system 100 can be adapted to detect light of other wavelengths including, gamma rays, X-rays, ultraviolet rays, infrared light, micro waves, radio waves, or the like. Additionally, a digital RGB camera system 100 can be adapted for still images, video images, and three-dimensional images, or the like. Accordingly, the present disclosure should not be construed to be limiting to the example digital RGB camera system 100 shown and described herein.

Figure 3A:
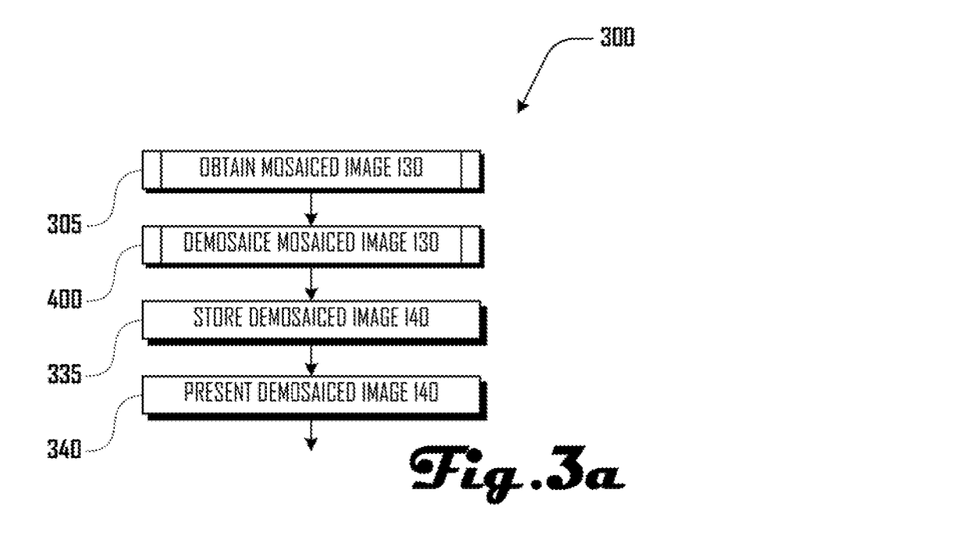
FIG. 3a is a flow chart of a method for generating, processing and presenting a digital image.

FIG. 3a is a flow chart of a method 300 for generating, processing and presenting a digital image in accordance with an embodiment. The method begins at sub-method 305, where a mosaiced image 130 (shown in FIG. 1a) is obtained. At sub-method block 400, the mosaiced image 130 is demosaiced to generate an RGB triplet image 140 (shown in FIG. 1b), and this RGB triplet image 140 is stored, at block 335. At block 340, the demosaiced image is presented, which can comprise presentation on the display 123 of the camera device 120 or presentation on any other suitable display or screen, via any suitable rendering, or the like.

Figure 3B:
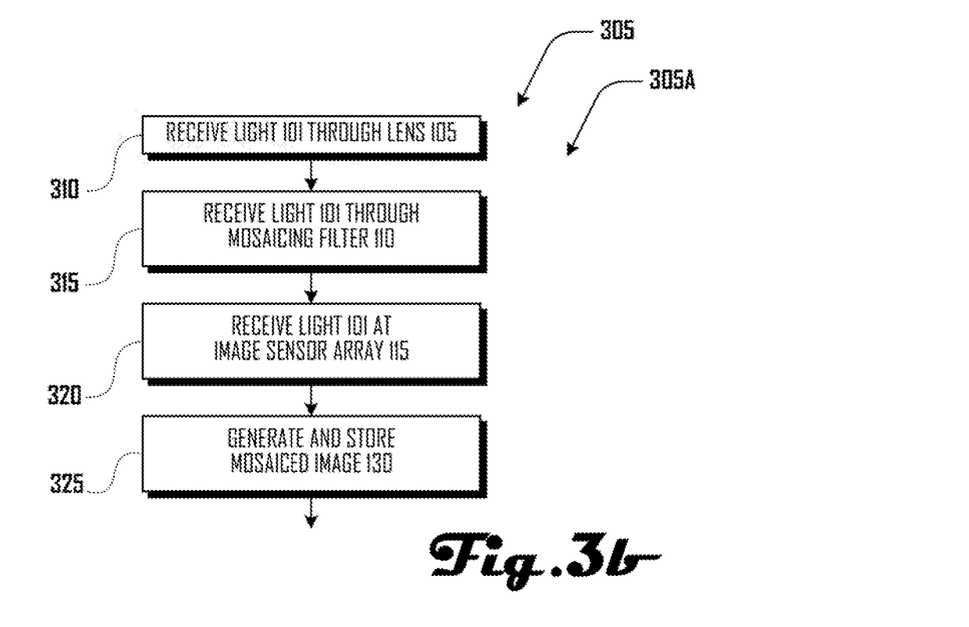

FIG. 3b is a flow chart of a sub-method 305A for generating a mosaiced digital image 130. The method 305A begins, at block 310, where light 101 (shown in FIG. 1a) is received through lens 105 (shown in FIG. 1a). At block 315, light 101 is received through mosaicing filter 110 (shown in FIG. 1a), and, at block 320, light 101 is received at image sensor array 115 (shown in FIG. 1a). At block 325, a mosaiced image 130 is generated and stored. For example, the mosaiced image 130 can be stored in the memory 122, which can include a buffer or other suitable memory device. In further embodiments, there may be various other suitable methods 300 for obtaining a mosaiced image 130. For example, a mosaiced image 130 may be obtained from a memory, downloaded from the Internet, received from a server, or the like.

Figure 4:
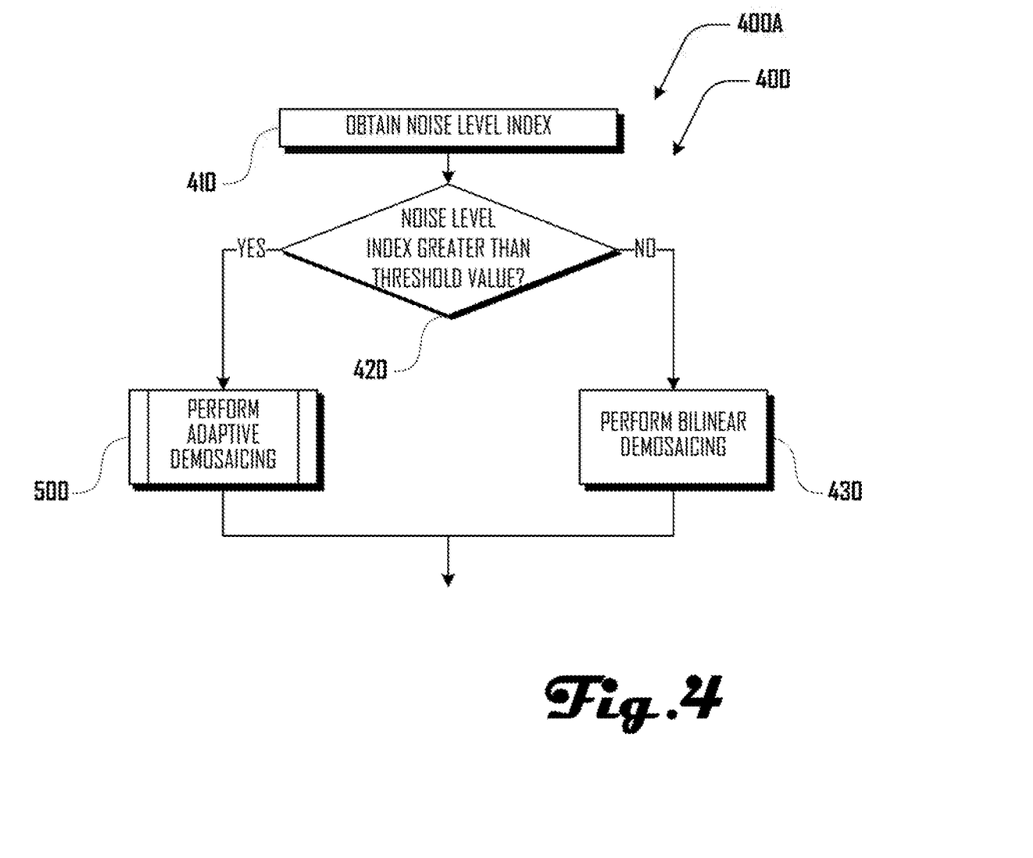

FIG. 4 is a flow chart of a sub-method 400A for demosaicing an image. The sub-method 400A is depicted as sub-method block 400 in FIG. 3a. The method 400A begins, at block 410, where a noise level index is obtained. In various embodiments, the noise level index can be an external parameter that is calculated based on a totality of a digital camera's ISO sensitivity value (International Organization for Standardization, Geneva, Switzerland), the camera's Automatic Gain Control (AGC) indexes, the camera's Digital Gain Control (DGC) index, or the like.

In decision block 420, a determination is made whether the noise level index is greater than a threshold value. In some embodiments, such a threshold value can be determined manually based on a specific hardware and settings configurations. For example, a user can test a given configuration of a digital camera with images having different noise levels and visually or analytically determine a threshold where bilinear demosaicing is preferable over adaptive demosaicing and set a threshold level where one demosaicing method is chosen over another. In some embodiments, an optimal threshold value can be calculated by mass qualitative and quantitative experiments on a given camera. For example, one determined optimal threshold value can be 0.76.

If the noise level is greater than the threshold value, the sub-method 400A continues to sub-method block 500, where adaptive demosaicing is performed. An example of such a method 500 is shown and described in more detail herein in relation to FIG. 5. However, if the noise level is less than the threshold value, the method 400A continues to block 430, where bilinear demosaicing is performed.

Bilinear demosaicing can be performed in any suitable way. For example, in one embodiment, bilinear demosaicing uses correlations with neighboring pixels to obtain the color intensities of the other colors. Referring again to FIG. 2, to obtain a green color value at position $R_5$, the following interpolation method can be used that relies on the values of green pixels that are nearest neighbors in vertical and/or horizontal directions.

$$\begin{cases} G_5 = \dfrac{G_4 + G_6}{2} & \Delta H > \Delta V \\ G_5 = \dfrac{G_2 + G_8}{2} & \Delta H < \Delta V \\ G_5 = \dfrac{G_2 + G_8 + G_4 + G_6}{2} & \text{else} \end{cases}$$

For example, given that the three color channels R, G, B have correlations, and given that neighboring pixel intensities often change smoothly, interpolation can be based on surrounding values. Accordingly, calculating a horizontal gradient $\Delta H$ and a vertical gradient $\Delta V$ can be used to select the interpolation direction. For example, pixel $R_5$ of FIG. 2 can have different slopes in these different directions:

$$\Delta H = \left| \frac{R_1 + R_9}{2} - R_5 \right|$$

$$\Delta V = \left| \frac{R_3 + R_7}{2} - R_5 \right|$$

In the embodiment discussed above, where $\Delta H > \Delta V$ the vertical interpolation values can be selected. For example, referring to FIG. 2, the green value at $R_5$ can be calculated using vertical interpolation by averaging the values of the nearest neighbors in the vertical direction or by calculating $(G_4+G_6)/2$.

On the other hand, where $\Delta H < \Delta V$ the horizontal interpolation values can be selected. For example, referring to FIG. 2, the green value at $R_5$ can be calculated using horizontal interpolation by averaging the values of the nearest neighbors in the horizontal direction or by calculating $(G_2+G_8)/2$.

However, where $\Delta H = \Delta V$ the four nearest neighbors can be averaged and used as the interpolation value. For example, referring to FIG. 2, the four nearest neighbor values can be averaged to obtain the green value at $R_5$ by calculating $(G_2+G_8+G_4+G_6)/4$.

Figure 5:
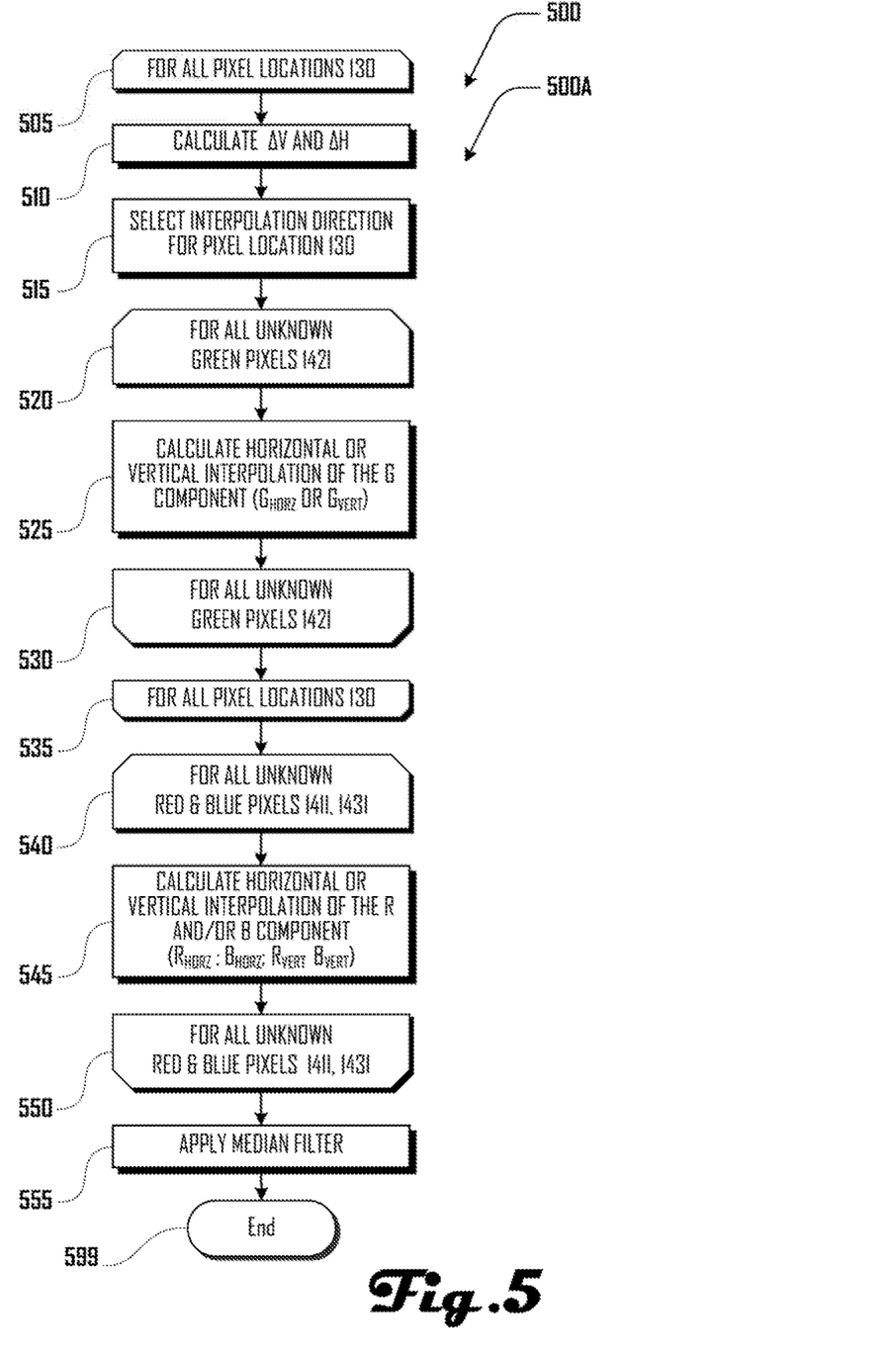
FIG. 5 is a flow chart of a sub-method for adaptive demosaicing of an image, which is a portion of the method depicted in FIG. 4.

FIG. 5 is a flow chart of a sub-method 500 for adaptive demosaicing of an image, which is a portion of the method depicted in FIG. 4. The sub-method 500 begins, at loop block 505, for all pixel locations 130 (see FIG. 1b). In block 510, $\Delta V$ and $\Delta H$ values for the given pixel location 130 are determined based on the known color for that pixel location, and at block 515 an interpolation direction for the pixel location 130 is selected.

For example, and referring to FIG. 2, computing the $\Delta V$ and $\Delta H$ values for known-red pixel location $R_5$, can be performed as follows.

$$\Delta H = |(R_1+R_9)/2-R_5|$$

$$\Delta V = |(R_3+R_7)/2-R_5|$$

Obtaining ΔV and ΔH values for each pixel can be used to determine if horizontal or vertical interpolation should be used. For example, in some embodiments, a determination is made that horizontal interpolation should be selected if ΔH<ΔV. On the other hand, a determination is made that vertical interpolation should be selected if ΔH>ΔV. Where ΔH=ΔV an arbitrary selection can be made or the four nearest neighbor values can be averaged to obtain the value.

In further embodiments, other suitable methods of determining whether to use vertical or horizontal interpolation can be used, and such methods can be simple or complex. For example, the method described above uses one nearest-neighbor pixel in each direction. However, in some embodiments, two or more nearest neighbors in each direction can be used. Multiple methods may be used at the same time or combined in some embodiments.

In some embodiments, it may be desirable to estimate and identify potential edges so as to avoid interpolating across such edged. For example, referring to FIG. 2, computing ΔV and ΔH values for pixel $R_5$, can be performed as follows.

$$\Delta H = |(G_2 - G_8)|$$

$$\Delta V = |(G_4 - G_6)|$$

In some embodiments, it may be desirable to use a Laplacian operator for edge detection and/or detection of rapid intensity changes. For example, referring to FIG. 2, computing ΔV and ΔH values for pixel % $R_5$, can be performed as follows.

$$\Delta H = |(G_2 - G_8)| + |R_5 - R_1 + R_5 - R_9|$$

$$\Delta V = |(G_4 - G_6)| + |R_5 |R_3 + R_5 - R_7|$$

In various embodiments, the selection method can be based on weighing time and internal storage costs relative to the capabilities of the camera device 120 (see FIG. 1a), or other device that may be processing images.

At block 520, a loop begins for all unknown green pixels 142I. At block 525, the vertical or horizontal interpolation values for the given unknown green pixel 142I are determined based on the selected direction, and at loop block 530, the loop for all unknown green pixels 142I ends. The loop for all pixel locations 130 ends in block 535.

For example, in some embodiments, the horizontal green interpolation values can be determined as follows. Let R(•), G(•), and B(•) respectively represent the red, green, and blue pixels on the Bayer map. Suppose that G(x)−R(x) changes gradually; in other words, the high frequency portion of this differential image changes more rapidly than G(x). For computation of a horizontal interpolation value RGRG, respective rows in the Bayer map (e.g., the row of pixels [$R_1$, $G_2$, $R_5$, $G_8$, $R_9$] labeled 205 in FIG. 2) are used. In row 205, for example, the even numbered green pixels and odd numbered red pixels are all given quantities. Let a random signal be represented as P(x), and let $P_0(x)$ and $P_1(x)$ be the even and odd values of the known signals respectively.

$$P_0(x) = \begin{cases} P(x), & x \in \text{even} \\ 0, & x \in \text{odd} \end{cases}$$

$$P_1(x) = \begin{cases} 0, & x \in \text{even} \\ P(x), & x \in \text{odd} \end{cases}$$

Where $G_0(x)$ and $G_1(x)$ are the even and odd signals respectively of G(x), then $G_0(x)$ is known and can be directly obtained from the Bayer data, but $G_1(x)$ cannot. For example, referring to FIG. 2, and row 205, the green values of pixels $G_2$ and $G_8$ are known because these pixels already exclusively contain green pixel data. On the other hand, pixels $R_1$, $R_5$ and $R_9$ only contain red values, and therefore green values are unknown at these pixel locations.

Accordingly, $G(x)=G_0(x)+G_1(x)$, where all $G_0(x)$ values are already known (e.g., 'G' labeled pixels 142K in green portion 142, shown in FIG. 1b). However, $G_1(x)$ values (e.g., blank pixels 142I in green portion 142, shown in FIG. 1b) are initially unknown and can be interpolated. Accordingly, this is approximately a lazy wavelet structure.

To obtain currently unknown values $G_1(x)$, assume that G(x) has passed through a linear filter h. In other words, G(x)=h(x)*G(x). Assuming G(x) is a band-limited signal and that h(x) is an ideal low-pass filter, the following can be derived.

$$G(x) = h_0(x)*G_0(x) + h_1(x)*G_0(x) + h_0(x)*G_1(x) + h_1(x)*G_1(x)$$

Accordingly low-pass filter h(x) has the following properties:

$$h_1(x)*G_0(x) = 0, \text{ where } x \text{ is even};$$

$$h_0(x)*G_1(x) = 0, \text{ where } x \text{ is even};$$

$$h_0(x)*G_0(x) = 0, \text{ where } x \text{ is odd; and}$$

$$h_1(x)*G_1(x) = 0, \text{ where } x \text{ is odd}.$$

The above equations can therefore be rewritten as follows.

$$G(x) = \begin{cases} G_0(x), & \text{for } x \text{ is even} \\ h_1(x)*G_0(x) + h_0(x)*G_1(x) & \text{for } x \text{ is odd} \end{cases}$$

Using this formula, it is therefore possible to interpolate all missing green pixel values using $G_0(x)$ and $R_1(x)$. In other words, interpolation of unknown pixel values $G_1(x)$ in an RGRGR row can be done using known values from the adjacent green pixels $G_0(x)$ and from the known red pixel values $R_1(x)$. For interpolation of GBGBG rows can similarly be done using known values from the adjacent green pixels $G_1(x)$ and from the known blue pixel values $B_0(x)$. This same analysis can be applied to RGRGR columns or GBGBG columns to determine vertical green pixel interpolation values.

Obtaining a zero phase Finite Impulse Response (FIR) filter h(x) that fulfills the constraints discussed above can be done by solving the following optimization problem:

$$\tilde{h}_{opt}(\xi) = arg\ min\|\hat{w}(\xi)(1-\hat{h}(\xi))\|^2$$

Where ^ represents the Fourier transform and w(•) is the weighting function. Such optimization to obtain a set value of filter h(x) can be done in various suitable ways, including but not limited to using the Matlab optimization toolbox (The MathWorks, Inc., Natick, Mass.), or the like.

To consider the effects of adjacent red and green pixels on the interpolated green value, it is possible to introduce impact factor δ to determine h as follows.

$$h = [0, 0.5, 0, 0.5, 0] + [-0.25, 0, 0.5, 0, -0.25]*\delta$$

In some embodiments, impact factor δ is set to 1, however, in further embodiments, impact factor δ can take any other suitable value.

Returning to the method 500 of FIG. 5, loop block 540 begins a loop for all unknown red and blue pixel values 141I, 143I, and in block 545 the horizontal or vertical interpolation values for unknown red and/or blue values 141I, 143I are calculated based on the selected interpolation direction for the pixel location 130. At loop block 550, the loop for all unknown red and blue pixel values 141I, 143I ends.

For example, with all green values previously known or interpolated in a horizontal or vertical direction, the method 500 continues by finding vertical or horizontal interpolation values for each of the unknown blue and/or red values. Referring to FIG. 1b many values for the red and blue portions 141, 143 of the RGB triple image 140 are still unknown (i.e., pixels 141I and 143I), and therefore can be interpolated. For example, in the red portion 141 pixels 141K marked with an 'R' are known from the mosaiced image 130, whereas the blank pixels 141I are not known and can be interpolated. Similarly, in the blue portion 143, pixels 143K marked with a 'B' are known from the mosaiced image 130, whereas the blank pixels 143I are not known and can be interpolated.

In various embodiments, interpolation of the unknown red and/or blue pixel values 141I, 143I can be performed as follows. For example, as discussed above an assumption is made that the differential image R–G is band limited and has a frequency substantially less than the Nyquist sampling rate. Accordingly, the differential image R–G can be reconstructed through the already-known differential image $R_S$–$G_S$. Similarly, differential image B–G can be reconstructed through the already-known differential image $B_S$–$G_S$. Accordingly, the following equations can respectively be used to calculate R–G and B–G, where L is a low-pass filter.

$$R-G=L*(R_S-G_S)$$

$$B-G=L*(B_S-G_S)$$

Accordingly the unknown red and/or blue values for a given pixel location 130 can be interpolated in a horizontal or vertical direction. In one embodiment, L can be a low-pass filter, L=[¼ ½ ¼; ½ 1 ½; ¼ ½ ¼]. However in further embodiments, L can be any suitable low-pass filter, or other type of filter.

Returning again to the method 500 of FIG. 5, in block 555, a median filter can be applied to the completed triplet RGB image 140. In block 599, the method 500 is done. For example, in various embodiments the interpolation method discussed above can produce some false-coloring or other undesirable effects. Given an assumption of gradual rate of change in R–G and B–G differential images, a median filter can be applied to remove or remediate false-coloring or other undesirable effects. For example in some embodiments, application of a median filter can provide the benefit of suppressing small changes in the image while preserving details. In some embodiments, a median filter can be applied iteratively any number of desirable times to produce a desired effect on the image.

The following examples are included to demonstrate exemplary embodiments. Those skilled in the art, however, should in light of the disclosure, appreciate that many changes can be made in the specific embodiments which are disclosed and still obtain a like or similar result without departing from the spirit and scope of the disclosure.

Example 1

The adaptive demosaicing methods described herein were used on a color porcupine moire test target image and compared to other demosaicing methods used on the same test target image. For example, tests were performed using bilinear demosaicing; Variable Number of Gradients (VNG) demosaicing; Patterned Pixel Grouping (PPG) demosaicing; DCB demosaicing (www.linuxphoto.org); Adaptive Filtered Demosaicing (AFD); and Variance of Color Differences (VCD) demosaicing. The test target images processed using adaptive demosaicing methods described herein showed better color restoration effects and better false color removal abilities compared to the other methods.

Example 2

The computational costs of the example embodiments discussed above were calculated (not including median filtering) in an example of analyzing a 64×64 signal block, giving statistics about the number of addition and multiplication operations for modules embodying various steps of the present methods. For example, module 1 included steps of G interpolation in the horizontal and vertical directions and R and B interpolation in only the horizontal direction; module 2 included interpolation of R and B in the vertical direction; module 3 included selection of horizontal or vertical interpolation based on calculated ΔH and ΔV values; and module 4 included preparation for median filtering. The table below (without median filtering) shows the results and illustrates that the present example embodiments described herein can be performed with relatively minimal computational overhead. This can be desirable regardless of whether the present methods are performed via hardware and/or software.

|  | Module 1 | Module 2 | Module 3 | Module 4 (not do) |
|---|---|---|---|---|
| Additions | 14 * 64 * 64 | 2 * 64 * 62 | 1 * 64 * 64 | 0 |
| Multiplications | 14 * 64 * 64 | 0 | 0 | 0 |

Example 3

Figure 6A:
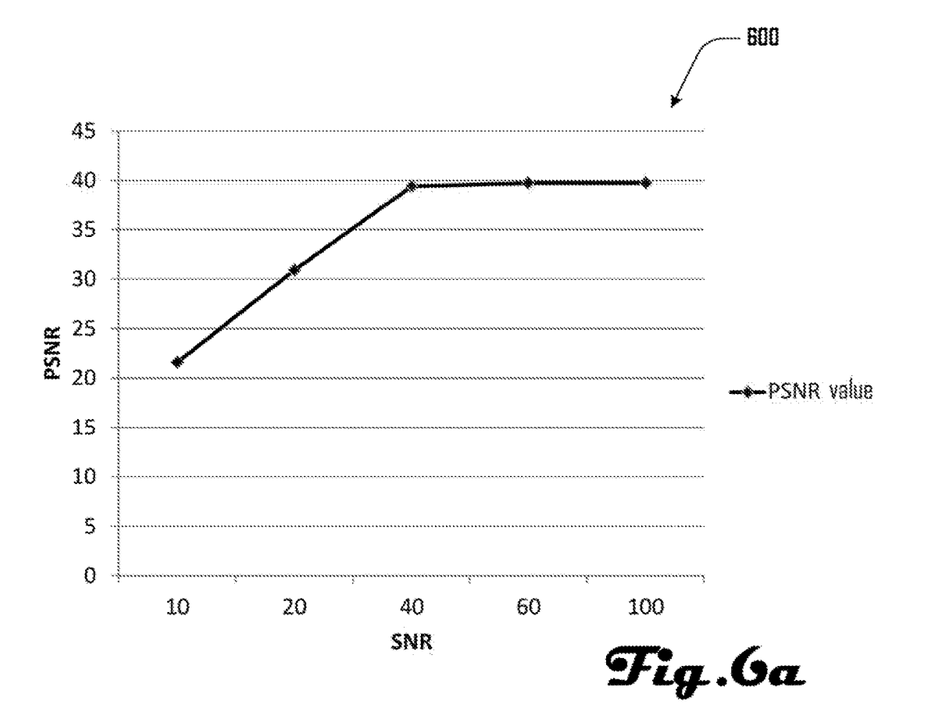
FIG. 6a depicts a graph of the Signal to Noise Ratio (SNR) of a plurality of mosaiced images compared to the Peak Signal to Noise Ratio (PSNR) of the demosaiced images.
Figure 6B:
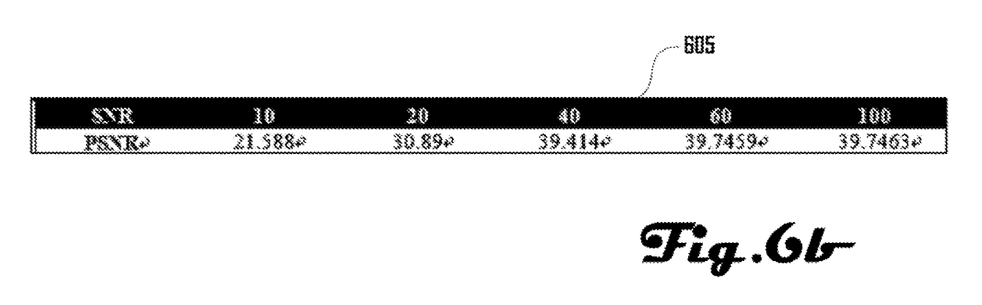

Mosaiced images of the exterior of a building at five different noise levels were demosaiced using the example embodiments described herein. The Signal to Noise Ratio (SNR) of the five mosaiced images was 10, 20, 40, 60 and 100 respectively. FIG. 6a depicts a graph 600 of the SNR of each mosaiced image compared to the Peak Signal to Noise Ratio (PSNR) of the demosaiced image and FIG. 6b shows a table 605 of the results depicted in the graph 600 of FIG. 6a. The images and data indicate that the presently described embodiments provide for robust demosaicing at various SNR levels.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method of demosaicing a mosaiced image, comprising:
   receiving the mosaiced image having a mosaic pattern with a first, second and third color;
   obtaining a noise level index for the mosaiced image;
   determining whether the noise level index is greater than a threshold value;

if the noise level index is not greater than the threshold value, then performing a bilinear demosaicing on the mosaiced image to generate a bilinearly demosaiced image; and if the noise level index is greater than the threshold value, then performing an adaptive demosaicing on the mosaiced image to generate an adaptively demosaiced image, the adaptive demosaicing comprising:

interpolating values of a portion of unknown pixels of the first color in a horizontal or vertical direction;

interpolating values of a portion of unknown pixels of the second color in a horizontal or vertical direction; and interpolating values of a portion of unknown pixels of the third color in a horizontal or vertical direction.

2. The method of claim 1, wherein the interpolating values of the portion of unknown pixels of the second and third color is based on the interpolation of the first values of the portion of unknown pixels of the first color.

3. The method of claim 1, wherein the interpolating values of the portion of unknown pixels of the second and third color occurs after the interpolation of the first values of the portion of unknown pixels of the first color.

4. The method of claim 1, wherein the mosaiced image comprises red, green and blue pixels in a Bayer pattern.

5. The method of claim 1, wherein the first color is green, the second color is red and the third color is blue.

6. The method of claim 1, wherein horizontal or vertical interpolation is selected based on known color data of a pixel location.

7. The method of claim 6, wherein the selecting one of horizontal and vertical interpolation comprises a respective vertical and horizontal nearest neighbor pixel comparison.

8. The method of claim 6, wherein selecting one of horizontal and vertical interpolation comprises calculating a horizontal gradient and calculating a vertical gradient.

9. The method of claim 1, wherein one of horizontal and vertical interpolation is selected for each given pixel location and interpolation of the unknown pixels of the first, second and third color is performed for that pixel location using the selected interpolation direction.

10. The method of claim 9, wherein selection of horizontal or vertical interpolation for a given pixel location is based on identifying an interpolation direction at that pixel location that has the least change among similar neighboring pixel color values.

11. The method of claim 1, wherein the adaptive demosaicing further comprises applying a median filter to the demosaiced image.

12. The method of claim 1, further comprising displaying the demosaiced image on a display.

13. The method of claim 1, wherein the receiving the mosaiced image comprises receiving the mosaiced image from an image sensor array.

14. The method of claim 1, further comprising generating the mosaiced image based on sensed light that passes through a lens and a mosaicing filter.

15. The method of claim 1, wherein the interpolating the values of unknown pixels of the first color comprises interpolating a value of an unknown pixel of the first color based on a low-pass filter, a known value of one of the second color and the third color at the pixel, and known values of the first color at neighboring pixels.

16. The method of claim 15, further comprising obtaining a zero phase finite impulse response filter as the low-pass filter by solving an optimization problem.

17. A camera system, comprising:
a lens;
a mosaicing filter;
an image sensor array configured to generate a mosaiced image comprising a mosaic pattern having a first, second and third color and based on sensed light that passes through the lens and the mosaicing filter; and
a processor configured to determine to:
obtain a noise level index of the mosaiced image;
determine whether the noise level index is greater than a threshold value;
perform a bilinear demosaicing on the mosaiced image to generate a bilinearly demosaiced image if the noise level index is not greater than the threshold value; and
perform an adaptive demosaicing on the mosaiced image to generate an adaptively demosaiced image, the adaptive demosaicing comprising:
interpolating values of a portion of unknown pixels of the first color in a horizontal or vertical direction;
interpolating values of a portion of unknown pixels of the second color in a horizontal or vertical direction; and
interpolating values of a portion of unknown pixels of the third color in a horizontal or vertical direction.

* * * * *